US009171689B2

(12) United States Patent
Liu et al.

(10) Patent No.: US 9,171,689 B2
(45) Date of Patent: Oct. 27, 2015

(54) METHOD FOR MAKING CARBON NANOTUBE FIELD EMITTER

(71) Applicants: Tsinghua University, Beijing (CN); HON HAI PRECISION INDUSTRY CO., LTD., New Taipei (TW)

(72) Inventors: Peng Liu, Beijing (CN); Li-Jiang Xu, Beijing (CN); Duan-Liang Zhou, Beijing (CN); Chun-Hai Zhang, Beijing (CN); Shou-Shan Fan, Beijing (CN)

(73) Assignees: Tsinghua University, Beijing (CN); HON HAI PRECISION INDUSTRY CO., LTD., New Taipei (TW)

(*) Notice: Subject to any disclaimer, the term of this patent is extended or adjusted under 35 U.S.C. 154(b) by 233 days.

(21) Appl. No.: 13/729,330

(22) Filed: Dec. 28, 2012

(65) Prior Publication Data

US 2014/0004768 A1    Jan. 2, 2014

(30) Foreign Application Priority Data

Jun. 28, 2012    (CN) .................. 2012 1 02177524

(51) Int. Cl.
| H01J 9/02 | (2006.01) |
| B82Y 40/00 | (2011.01) |
| H01J 1/304 | (2006.01) |

(52) U.S. Cl.
CPC ............... *H01J 9/025* (2013.01); *B82Y 40/00* (2013.01); *H01J 1/304* (2013.01); *Y10S 977/939* (2013.01)

(58) Field of Classification Search
None
See application file for complete search history.

(56) References Cited

U.S. PATENT DOCUMENTS

| 7,988,515 | B2 | 8/2011 | Wei et al. |
| 2005/0236951 | A1 | 10/2005 | Liu et al. |
| 2007/0103048 | A1* | 5/2007 | Liu et al. ................ 313/311 |
| 2007/0296323 | A1* | 12/2007 | Liu et al. ................ 313/311 |
| 2008/0170982 | A1* | 7/2008 | Zhang et al. ............ 423/447.3 |
| 2009/0155467 | A1 | 6/2009 | Wang et al. .............. 427/294 |
| 2009/0181239 | A1* | 7/2009 | Fan et al. ................ 428/327 |
| 2010/0282403 | A1* | 11/2010 | Liu et al. ................ 156/229 |
| 2010/0283375 | A1 | 11/2010 | Yang et al. |
| 2011/0160095 | A1 | 6/2011 | Jiang et al. |

FOREIGN PATENT DOCUMENTS

| TW | 200535898 | 11/2005 |
| TW | 201043570 | 12/2010 |
| TW | 201134754 | 10/2011 |

* cited by examiner

*Primary Examiner* — Britt D Hanley
(74) *Attorney, Agent, or Firm* — Novak Druce Connolly Bove + Quigg LLP (57) ABSTRACT

A method for making carbon nanotube field emitter includes providing a carbon nanotube array formed on a surface of a substrate. A plurality of carbon nanotubes of the carbon nanotube array is selected and pulled out a carbon nanotube film by a drawing tool, wherein the carbon nanotube film includes a plurality of carbon nanotubes oriented along a fixed direction. The carbon nanotube film is cut to a plurality of uniform carbon nanotube sub-films along the fixed direction. The plurality of carbon nanotube sub-films is treated to a plurality of carbon nanotube yarns. The plurality of carbon nanotube yarns is fixed on a surface of a conductive base, and cutting off the plurality of carbon nanotube yarns by a laser beam, to form a carbon nanotube field emitter.

18 Claims, 8 Drawing Sheets

METHOD FOR MAKING CARBON NANOTUBE FIELD EMITTER

RELATED APPLICATIONS

This application claims all benefits accruing under 35 U.S.C. §119 from China Patent Application No. 201210217752.4, filed on Jun. 28, 2012 in the China Intellectual Property Office, the disclosure of which is incorporated herein by reference.

BACKGROUND

1. Technical Field

The present application relates to a method for making carbon nanotube field emitter.

2. Discussion of Related Art

Many potential applications have been proposed for carbon nanotubes, including conductive and high-strength composites, energy storage and energy conversion devices, sensors, field emission displays, and nanometer-sized semiconductor devices.

A method for making a field emission electron source is taught by U.S. Pat. No. 7,988,515 to Wei et al. The method includes steps of: (a) providing a CNT array; (b) drawing a bundle of CNTs from the CNT array to form a CNT film; (c) soaking the CNT film in an organic solvent, and shrinking the CNT film into a CNT string after the organic solvent volatilizing; (d) applying a voltage between two opposite ends of the CNT string, until the CNT string snaps at a certain point; and (e) attaching the snapped CNT string to a conductive base, and achieving a field emission electron source.

However, a field emitter of carbon nanotube array is made by a plurality of the snapped CNT strings, the snapped CNT strings are difficult to manipulate and be mass produced in a large quantity. Furthermore, it is difficult to make the distance between adjacent snapped CNT strings uniform, which affects field emission efficiency of the field emitter.

What is needed, therefore, is to provide a method for making carbon nanotube field emitter with high field emission efficiency, and the method should be easy to operate and able to mass produce the carbon nanotube field emitters.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
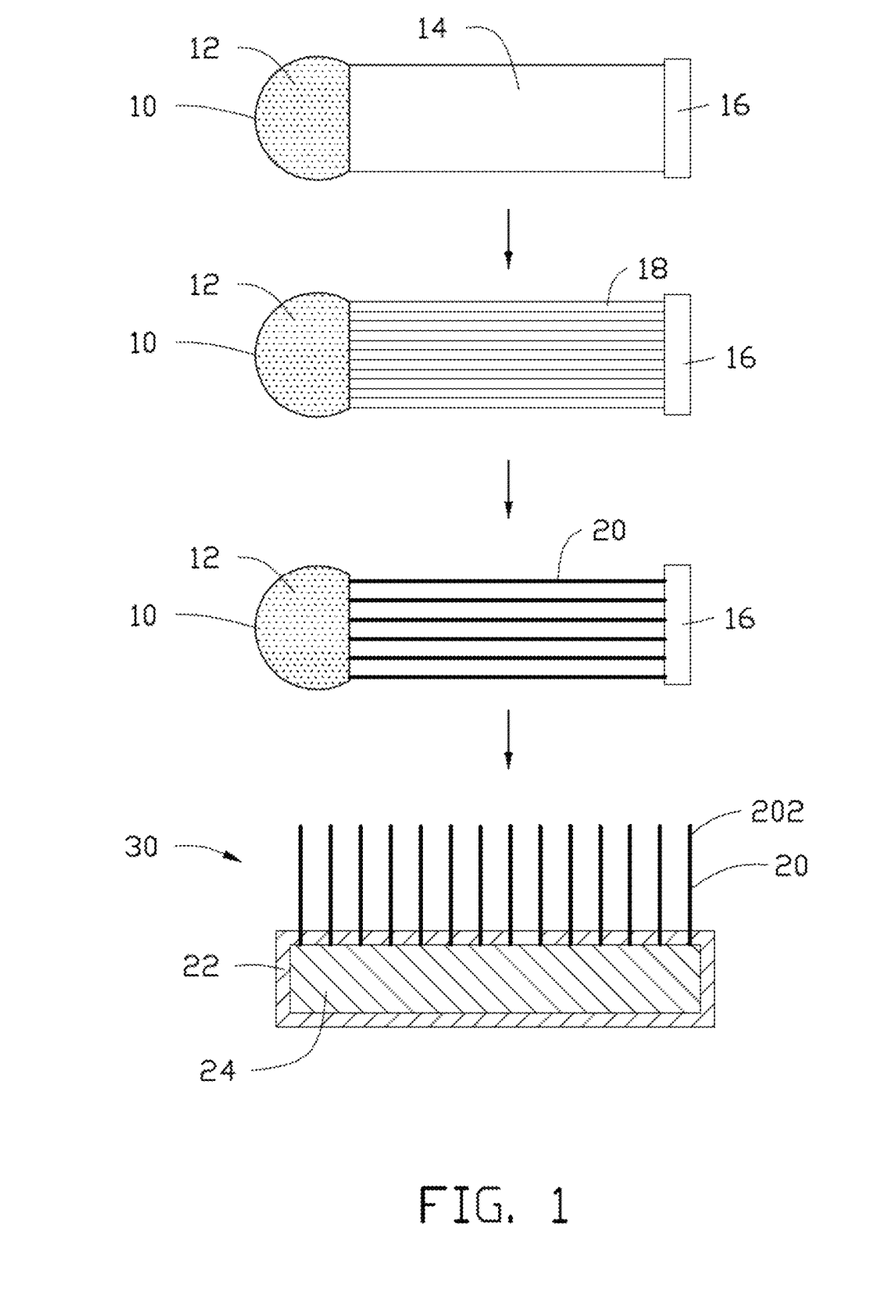
FIG. 1 is a schematic view of one embodiment of a method for making carbon nanotube field emitter.

Referring to FIG. 1, a method for making a carbon nanotube field emitter 30 of one embodiment includes steps of:

(S1), providing a carbon nanotube array 12 formed on a surface of a substrate 10;

(S2), selecting a plurality of carbon nanotubes of the carbon nanotube array 12 and pulling out a carbon nanotube film 14 by a drawing tool 16, wherein the carbon nanotube film 14 includes a plurality of carbon nanotubes oriented along a fixed direction;

(S3), cutting the carbon nanotube film 14 to form a plurality of uniform carbon nanotube sub-films 18 along the fixed direction;

(S4), treating the plurality of carbon nanotube sub-films 18 to form a plurality of carbon nanotube yarns 20; and (S5), fixing the plurality of carbon nanotube yarns 20 on a surface of a conductive base 22, and cutting off the plurality of carbon nanotube yarns 20 between the carbon nanotube array 12 and the drawing tool 16 by a laser beam, to form a carbon nanotube field emitter 30.

In step (S1), the substrate 10 can be a substantially flat and smooth silicon substrate with a diameter of 4 inches, wherein the silicon substrate can be a P-type silicon wafer, an N-type silicon wafer or a silicon wafer formed with an oxidized layer thereon. In one embodiment, a 4-inch, P-type silicon wafer is used as the substrate 10.

The carbon nanotube array 12 is made by chemical vapor deposition (CVD) method in one embodiment. The chemical vapor deposition method includes the steps of:

(S11), providing the substrate 10;

(S12), forming a catalyst on the surface of the substrate 10, wherein the catalyst can be made of iron, cobalt, nickel, or any combination alloy thereof;

(S13), annealing the substrate 10 with the catalyst at a temperature ranging from about 700° C. to about 900° C. in air for about 30 minutes to about 90 minutes;

(S14), heating the substrate 10 with the catalyst at a temperature ranging from about 500° C. to about 740° C. in a furnace with a protective gas therein; and (S15), supplying a carbon source gas to the furnace for about 5 minutes to about 30 minutes and growing the carbon nanotube array 12, wherein the carbon source gas may be hydrocarbon gas, such as ethylene, methane, acetylene, ethane, or any combination thereof.

Moreover, the carbon nanotube array 12 formed under the above conditions is essentially free of impurities such as carbonaceous or residual catalyst particles. The carbon nanotube array 12 related in the step (S1) is not limited to the above-described method.

In the step (S2), the carbon nanotube film 14 is obtained by pulling the plurality of carbon nanotubes of the carbon nanotube array 12 by the substeps of:

(S21), selecting the plurality of carbon nanotubes of the carbon nanotube array 12 having a predetermined width, and then using the drawing tool 16 with the predetermined width to secure ends of the plurality of carbon nanotubes of the carbon nanotube array 12; and (S22), pulling the drawing tool 16 away from the carbon nanotube array 12 at an even/uniform speed to make the plurality of carbon nanotubes of the carbon nanotube array 12 separate from the carbon nanotube array 12, to form the carbon nanotube film 14.

In the step (S22), a pulling direction can be substantially perpendicular to the growing direction of the carbon nanotube array 12. The drawing tool 16 can be a nipper, a clamp and so on.

In the step (S22), during the pulling process, when ends of the plurality of carbon nanotubes are drawn out, other carbon nanotubes are also drawn out in a manner that ends of carbon nanotubes are connected with ends of adjacent carbon nanotubes by the van der Waals attractive force between the ends of carbon nanotubes. Therefore, the continuous carbon nanotube film 14 can be formed.

Figure 2:
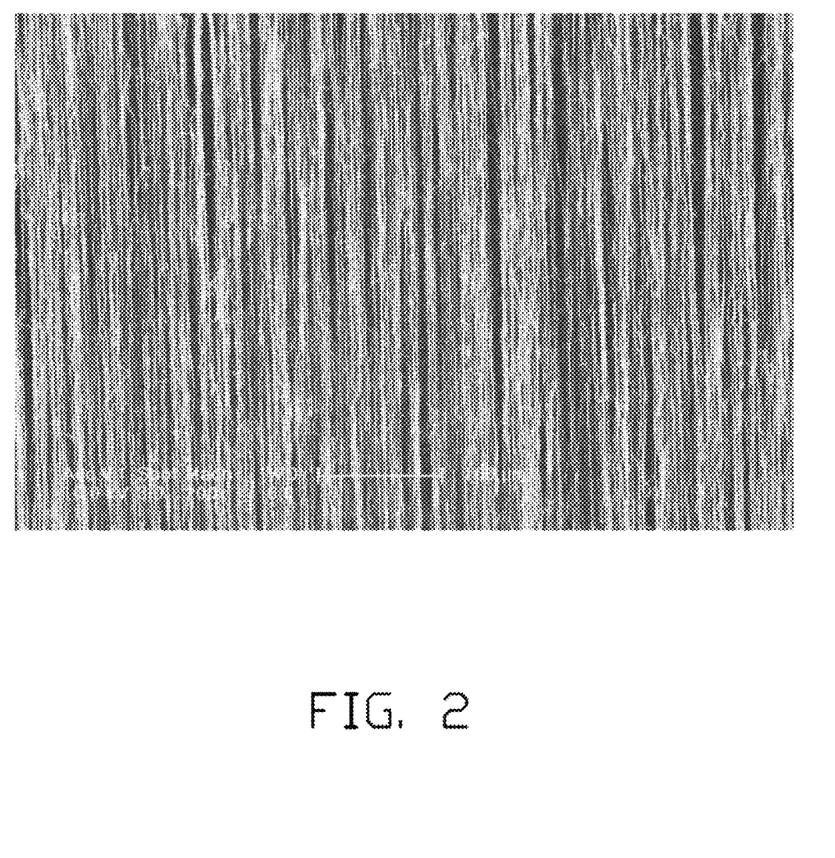
FIG. 2 shows a scanning electron microscope (SEM) image of a carbon nanotube film.

The carbon nanotube film 14 includes a plurality of carbon nanotubes joined end-to-end by van der Waals attractive force along the fixed direction. The fixed direction is parallel to a length direction of the plurality of carbon nanotubes. The plurality of carbon nanotubes is oriented parallel to the pulling direction of the carbon nanotube film 14. FIG. 2 shows a scanning electron microscope image of the carbon nanotube film 14.

In the step (S3), the carbon nanotube film 14 can be cut by a laser beam scanning method or an electron beam scanning method. The cutting process can be processed in an atmosphere or an active such as oxygen environment. In one embodiment, the laser beam scanning method is used to cut the carbon nanotube film 14. A power of the laser beam can be in a range from about 1 milliwatt to about 80 watts. A moving speed of the laser beam can be in a range from about 1 mm/s to about 1000 mm/s. In one embodiment, the moving speed of the laser beam is in a range from about 10 mm/s to about 1000 mm/s. In one embodiment, the power of the laser beam is in a range from about 5 watts to about 50 watts, and the moving speed of the laser beam is in a range from about 100 mm/s to about 500 mm/s.

It is to be understood, the step (S4) can also be carried out by fixing the laser beam and moving the carbon nanotube film 14, or fixing the carbon nanotube film 14 and moving the laser beam.

The carbon nanotube film 14 can be cut into the plurality of carbon nanotube sub-films 18. In one embodiment, the plurality of carbon nanotube sub-films 18 has the same width; the plurality of carbon nanotube sub-films 18 has equal distance between adjacent two of the carbon nanotube sub-films 18. The width of the plurality of carbon nanotube sub-films 18 can be in a range from about 10 millimeters to about 500 millimeters. A distance between adjacent two of the carbon nanotube sub-films 18 can be in a range from about 100 micrometers to about 300 micrometers. In one embodiment, the width of the plurality of carbon nanotube sub-films 18 is about 100 millimeters, and the distance between adjacent two of the carbon nanotube sub-films 18 is about 200 micrometers.

In the step (S4), treating the plurality of carbon nanotube sub-films 18 to form the plurality of carbon nanotube yarns 20 can be carried out by shrinking the plurality of carbon nanotube sub-films 18 with organic solvent or twisting the plurality of carbon nanotube sub-films 18.

Treating the plurality of carbon nanotube sub-films 18 with the organic solvent can be carried out by dripping the organic solvent onto the plurality of carbon nanotube sub-films 18 or putting the plurality of carbon nanotube sub-films 18 in the organic solvent to soak the entire surfaces of the plurality of carbon nanotube sub-films 18 or fumigated with vapors. Since the untreated carbon nanotube sub-film 18 is composed of a plurality of carbon nanotubes, the untreated carbon nanotube sub-film 18 has a high surface-area-to-volume ratio and thus may easily become stuck to other objects. During the surface treatment, the plurality of impending carbon nanotube sub-films 18 is shrunk into the plurality of carbon nanotube yarns 20 after the organic solvent volatilizes due to factors such as surface tension. The surface-area-to-volume ratio and the diameter of the treated carbon nanotube sub-film 18 are reduced, while the strength and toughness is improved. The organic solvent may be a volatilizable organic solvent, such as ethanol, methanol, acetone, dichloroethane, chloroform, or any appropriate mixture thereof.

In the process of twisting separately each of the plurality of carbon nanotube sub-films 18 to each of the plurality of carbon nanotube yarns 20, the plurality of carbon nanotube sub-films 18 is still drawn and joined with the carbon nanotube array 12. One end of the plurality of carbon nanotube sub-films 18 is connected with the carbon nanotube array 12 by van der Waal attractive force, another end is held by the drawing tool 16. The substrate 10 can be fixed, while the drawing tool 16 is rotated, the plurality of carbon nanotube sub-films 18 is twisted into the plurality of carbon nanotube yarns 20. The rotation direction is substantially perpendicular to the pulling direction of the carbon nanotube film 14.

While rotating the drawing tool 16, a pulling force is still applied on the plurality of carbon nanotube sub-films 18, and the plurality of carbon nanotube sub-films 18 is twisted. In one embodiment, the value of twist force is in a range from about 0.00005 Newton to about 0.001 Newton.

Each of the plurality of carbon nanotube yarns 20 includes a plurality of carbon nanotubes joined end-to-end by van der Waal attractive force and oriented along an axial of the plurality of carbon nanotube yarns 20. One end of the plurality of carbon nanotube yarns 20 is connected with the carbon nanotube array 12, another end is held by the drawing tool 16. A length of the plurality of carbon nanotube yarns 20 can be in a range from about 0.1 millimeters to about 2 millimeters. A diameter of the plurality of carbon nanotube yarns 20 can be in a range from about 1 micrometer to about 30 micrometers. In one embodiment, the diameter of the plurality of carbon nanotube yarns 20 is 20 micrometers.

In the step (S5), the plurality of carbon nanotube yarns 20 can be placed on the surface of the conductive base 22 by a fixing layer 24. The fixing layer 24 can be made of a conductive material, such as, conductive polymer or conductive adhesive. In one embodiment, the fixing layer 24 is made of a conductive adhesive. The conductive base 22 can be made of a conductive material, such as, metal, conductive glass, or conductive slurry. The conductive base 22 can be a conductive film located on an insulating substrate.

In the step (S5), in the process of cutting off the plurality of carbon nanotube yarns 20 by the laser beam, the plurality of carbon nanotube yarns 20 is still joined with the carbon nanotube array 12. One end of the plurality of carbon nanotube yarns 20 is connected with the carbon nanotube array 12 by van der Waal attractive force, and another end is held by the conductive base 22. The insulating substrate can be made of porcelain, glass, resin, quartz, or any combination thereof.

The laser beam with a predetermined width scans the plurality of carbon nanotube yarns 20 between the carbon nanotube array 12 and the conductive base 22. The laser beam scans the plurality of carbon nanotube yarns 20 along a line perpendicular to the axial direction of the plurality of carbon nanotubes. The laser beam can be a YAG laser. A wavelength of the laser beam can be about 1.06 micrometers and a bean spot diameter of the laser beam can be about 30 micrometers. The power of the laser beam can be in a range from about 3.6 to about 12 watts, and the moving speed of the laser beam can be in a range from about 1 to about 1000 mm/s. After cutting the plurality of carbon nanotube yarns 20 by the laser beam, a broken portion of the plurality of carbon nanotube yarns 20 functions as an electron emitting end 202. One end of the plurality of carbon nanotube yarns 20 away from the conductive base 22 is the electron emitting end 202. The electron emitting end 202 is a flat and is not a protrusion tip. Snapped CNT string formed by applying a voltage between two opposite ends of the CNT string has a protrusion tip in prior art, wherein an end of the snapped CNT string is closed. Relative to the protrusion tip, the flat electron emitting end 202 has a plurality of electron emitting points, lower emitting voltage and higher emitting current.

An end of the electron emitting end 202 can be open or closed by adjusting the power and moving speed of the laser beam. When the power of the laser beam is about 3.6 watts and the moving speed of the laser beam is in a range from about 5 mm/s to about 10 mm/s, the end of the electron emitting end 202 is open. When the power of the laser beam is about 9.6 watts and the moving speed of the laser beam is in a range from about 100 mm/s to about 200 mm/s, the end of the electron emitting end 202 is closed. When the end of the flat electron emitting end 202 is open, the electron emitting end 202 has high field emission efficiency.

A distance between the electron emitting end 202 and the conductive base 22 can be in a range from about 10 micrometers to about 10 millimeters. In one embodiment, the distance between the electron emitting end 202 and the conductive base 22 is in a range from about 10 micrometers to about 1 millimeter. In one embodiment, the distance between the electron emitting end 202 and the conductive base 22 is 200 micrometers. The distance between the electron emitting end 202 and the conductive base 22 is a length of the plurality of carbon nanotube yarns 20 of the carbon nanotube field emitter 30. A distance between adjacent two of the carbon nanotube yarns 20 is 1.5 times-2.0 times as long as the length of the plurality of carbon nanotube yarns 20 of the carbon nanotube field emitter 30, further reducing shielding effect between adjacent two of the carbon nanotube yarns 20 and improving field emitting property of the carbon nanotube field emitter 30.

It is to be understood, when the drawing tool 16 is made of conductive material, the conductive base 22 should not be used because the drawing tool 16 can also function as the conductive base 22.

Figure 3:
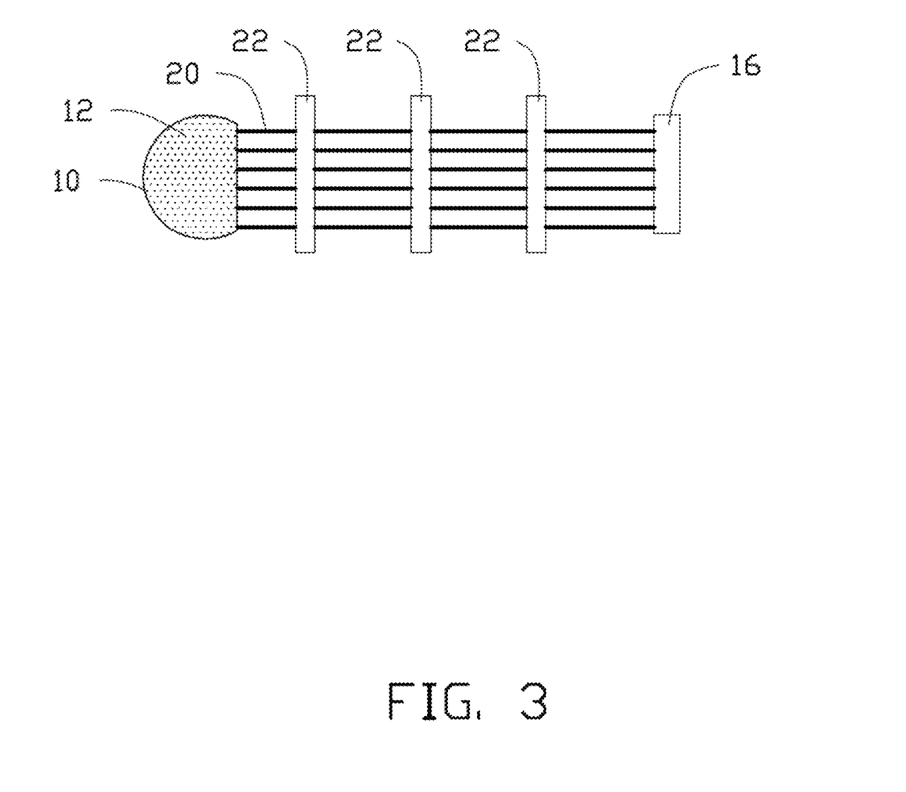
FIG. 3 shows a schematic view of one embodiment of a plurality of carbon nanotube strings on a plurality of conductive bases.

It is to be understood, the plurality of carbon nanotube yarns 20 is located on a plurality of conductive bases 22 spaced from each other. After cutting off the plurality of carbon nanotube yarns 20, a plurality of carbon nanotube field emitters 30 can be obtained, as shown in FIG. 3. The large-scale industrialization of the carbon nanotube field emitter 30 can be carried out.

Figure 4:
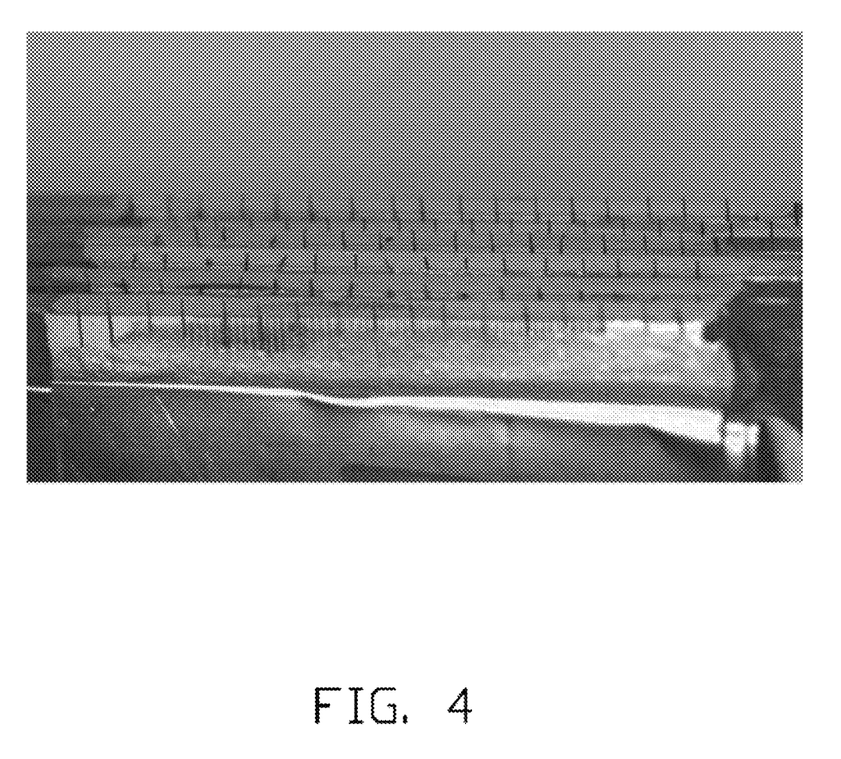
FIG. 4 is an optical microscope image of one embodiment of a carbon nanotube field emitter array.

It is to be understood, the plurality of carbon nanotube field emitters 30 can be overlapped or curled, to form a carbon nanotube field emitter array. In one embodiment, the carbon nanotube field emitter array includes 102 of the carbon nanotube yarns 20, as shown in FIG. 4.

Figure 5:
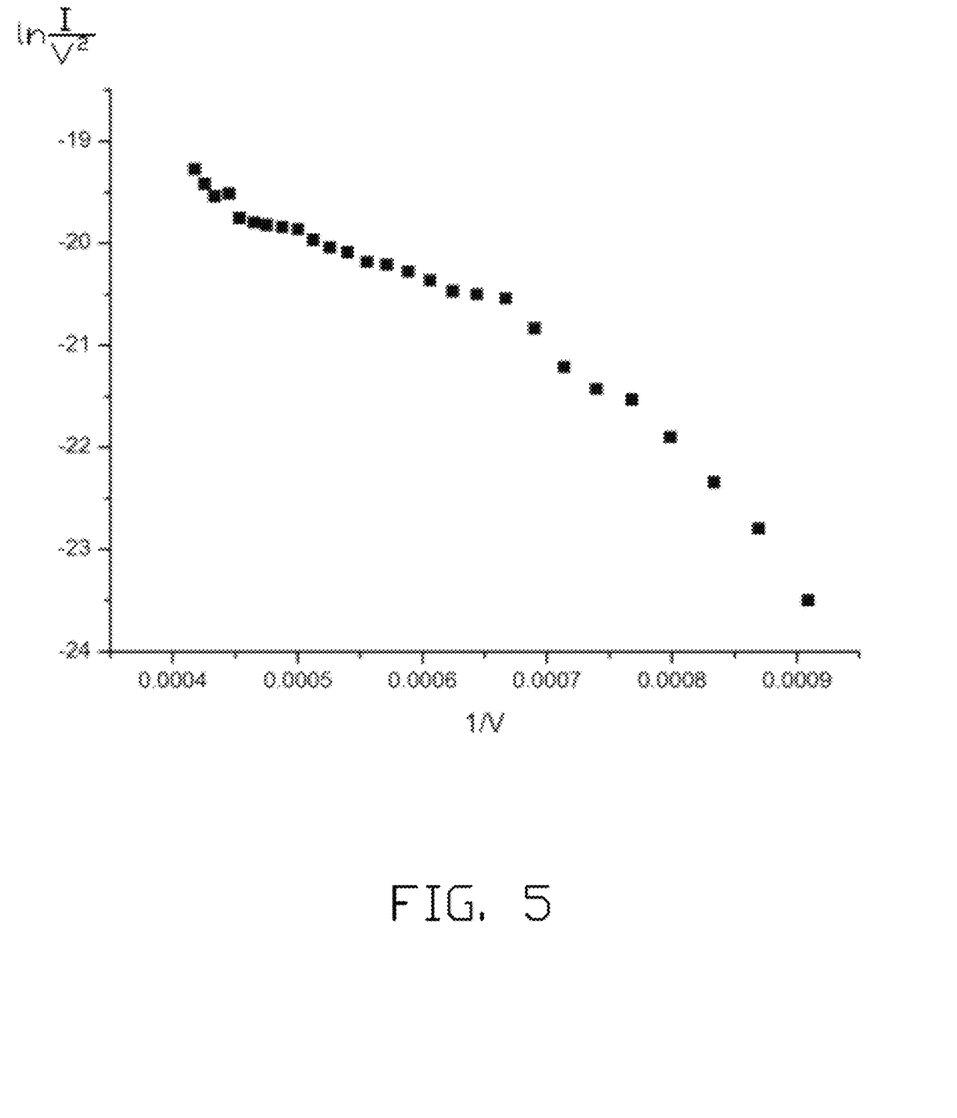
FIG. 5 is a Fowler-Nordheim curve of one embodiment of the carbon nanotube field emitter array of FIG. 4.
Figure 6:
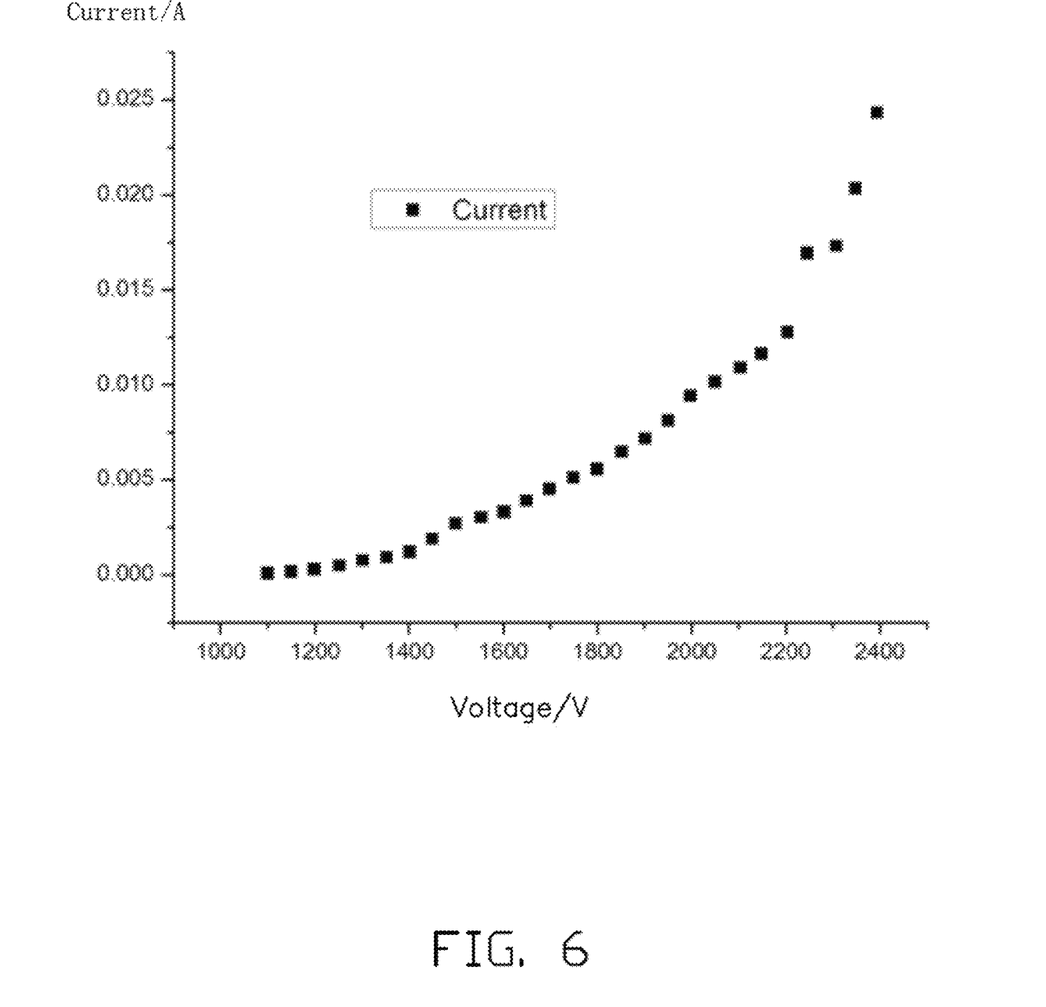
FIG. 6 is a current-voltage curve of one embodiment of the carbon nanotube emitter layer of FIG. 4.

FIG. 5 shows a Fowler-Nordheim curve of the carbon nanotube field emitter array in a pulse frequency of 50 hertz and a pulse width of 15 microseconds. FIG. 5 shows that the carbon nanotube field emitter array has good field emission property. FIG. 6 shows a current-voltage curve of the carbon nanotube field emitter array in the pulse frequency of 50 hertz and the pulse width of 15 microseconds. Referring to FIG. 6, when an emission voltage of the carbon nanotube field emitter array is 2400 volts, an emission current of the carbon nanotube field emitter array is 0.025 amperes. When the carbon nanotube field emitter array including 60 of the carbon nanotube yarns 20 emits a current of 60 amperes in an emitting voltage of 3000 volts, each of the carbon nanotube yarns 20 can emit a current of 1 milliampere. Therefore, the carbon nanotube field emitter 30 has a larger emission current density.

Figure 7:
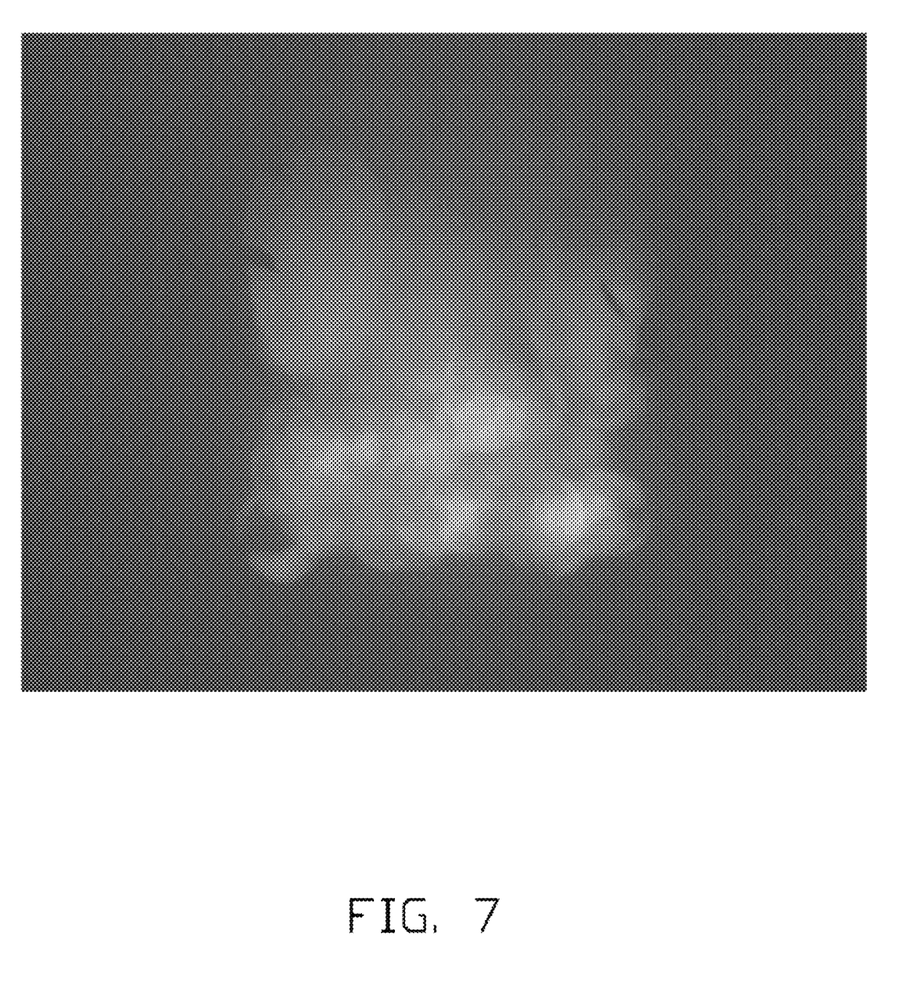
FIG. 7 is an optical image of light emitted by an anode of one embodiment of the carbon nanotube field emitter array of FIG. 4.

Referring to FIG. 7, each emitting spot of each of the carbon nanotube yarns 20 of the carbon nanotube field emitterarray has substantially the same shape and size. Therefore, each of the carbon nanotube yarns 20 of the carbon nanotube field emitter 30 has substantially the same field emitting property.

Figure 8:
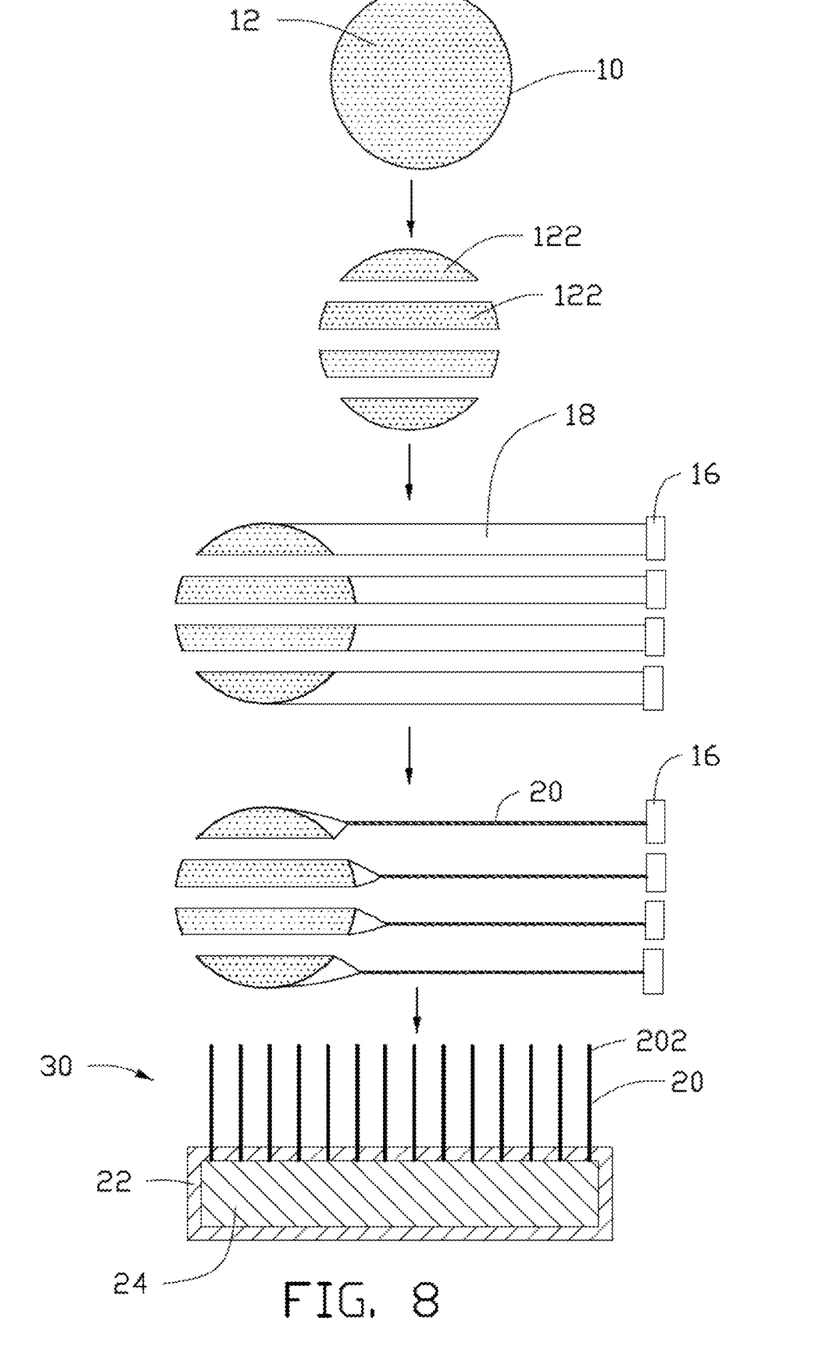
FIG. 8 is a schematic view of another embodiment of a method for making carbon nanotube field emitter.

Referring to FIG. 8, a method for making a carbon nanotube field emitter 30 of another embodiment includes the steps of:

(S1), providing a carbon nanotube array 12 formed on a surface of a substrate 10;

(S2), cutting the carbon nanotube array 12 to form a plurality of uniform carbon nanotube sub-arrays 122;

(S3), selecting a plurality of carbon nanotubes of the plurality of carbon nanotube sub-arrays 122 and pulling out a plurality of carbon nanotube sub-films 18 by a plurality of drawing tools 16;

(S4), treating the plurality of carbon nanotube sub-films 18 to form a plurality of carbon nanotube yarns 20; and (S5), fixing the plurality of carbon nanotube yarns 20 on a surface of a conductive base 22, and cutting off the plurality of carbon nanotube yarns 20 between the carbon nanotube array 12 and the drawing tool 16 by a laser beam, to form a carbon nanotube field emitter 30.

Referring to FIG. 8, the plurality of carbon nanotube sub-films 18 is made by cutting the carbon nanotube array 12 to form the plurality of carbon nanotube sub-arrays 122.

The carbon nanotube array 12 is cut by a laser beam to form the plurality of carbon nanotube sub-arrays 122 with equal space. The plurality of carbon nanotube sub-arrays 122 has the same width. The width of the plurality of carbon nanotube sub-arrays 122 can be in a range from about 10 millimeters to about 500 millimeters. In one embodiment, the width of the plurality of carbon nanotube sub-arrays 122 is 100 millimeters. A distance between adjacent two of the carbon nanotube sub-arrays 122 can be in a range from about 100 micrometers to about 300 micrometers. In one embodiment, the distance between adjacent two of the carbon nanotube sub-arrays 122 is 200 micrometers.

In summary, the carbon nanotube field emitter 30 made by the above-described method has a plurality of carbon nanotube yarns 20 with a neat arrangement. The plurality of carbon nanotube yarns 20 has the same height and equal distance between adjacent two of the carbon nanotube yarns 20. Therefore, each of the plurality of carbon nanotube yarns 20 has the same field emitting property. The distance between adjacent two of the carbon nanotube yarns 20 is 1.5 times-2.0 times as long as the length of the plurality of carbon nanotube yarns 20 of the carbon nanotube field emitter 30, further reducing shielding effect between adjacent two of the carbon nanotube yarns 20 and improving field emitting property of the carbon nanotube field emitter 30. Further, the flat electron emitting end 202 of the carbon nanotube field emitter 30 has a plurality of electron emitting points, lower emitting voltage and higher emitting current. The end of the flat electron emitting end 202 is open, improving field emission efficiency of the carbon nanotube field emitter 30. Moreover, the method for making the carbon nanotube field emitter 30 is easy to operate and to able to achieve industrialization.

It is to be understood that the above-described embodiment is intended to illustrate rather than limit the disclosure. Variations may be made to the embodiment without departing from the spirit of the disclosure as claimed. The above-described embodiments are intended to illustrate the scope of the disclosure and not restricted to the scope of the disclosure.

It is also to be understood that the above description and the claims drawn to a method may include some indication in reference to certain steps. However, the indication used is only to be viewed for identification purposes and not as a suggestion as to an order for the steps.

What is claimed is:

1. A method for making carbon nanotube field emitter comprising:
   (S1) providing a carbon nanotube array formed on a surface of a substrate;
   (S2) selecting a plurality of carbon nanotubes of the carbon nanotube array and pulling out a carbon nanotube film from the plurality of carbon nanotubes which have been selected by a drawing tool, wherein the plurality of carbon nanotubes in the carbon nanotube film are oriented along a same direction;
   (S3) cutting the carbon nanotube film along an oriented direction of the plurality of carbon nanotubes to form a plurality of carbon nanotube sub-films which are uniform along the oriented direction, the carbon nanotube film comprises a first end and a second end opposite to the first end, in the step of cutting the carbon nanotube film, the first end is connected to the carbon nanotube array by van der Waal attractive force, and the second end is held by the drawing tool;
   (S4) treating the plurality of carbon nanotube sub-films to form a plurality of carbon nanotube yarns; and
   (S5) fixing the plurality of carbon nanotube yarns on a surface of at least one conductive base, and cutting off the plurality of carbon nanotube yarns by a laser beam to form a carbon nanotube field emitter.

2. The method of claim 1, wherein in the step (S3), the carbon nanotube film is cut by a laser beam or an electron beam.

3. The method of claim 2, wherein a power of the laser beam is in a range from about 1 milliwatt to about 80 watts, and a moving speed of the laser beam is in a range from about 10 mm/s to about 1000 mm/s.

4. The method of claim 1, wherein in the step (S3), the plurality of carbon nanotube sub-films are equal in a width in a range from about 10 millimeters to about 500 millimeters, a distance between adjacent two of the carbon nanotube sub-films is in a range from about 100 micrometers to about 300 micrometers.

5. The method of claim 1, wherein in the step (S4), the plurality of carbon nanotube yarns comprises a plurality of carbon nanotubes joined end-to-end by van der Waal attractive force and oriented along an axial direction of the plurality of carbon nanotube yarns.

6. The method of claim 1, wherein in the step (S5), further comprises joining one end of the plurality of carbon nanotube yarns with the carbon nanotube array by van der Waal attractive force before cutting off the plurality of carbon nanotube yarns.

7. The method of claim 1, wherein in the step (S5), further comprising attaching a fixing layer on a surface of the conductive base wherein the fixing layer is adapted to fix the plurality of carbon nanotube yarns on the conductive base.

8. The method of claim 1, wherein in step (S5) the plurality of carbon nanotube yarns are fixed on the conductive base at a substantially equal distance between each two adjacent carbon nanotube yarns and are cut at a substantially equal height by the laser beam.

9. The method of claim 1, wherein in the step (S5) further comprises, after cutting off the plurality of carbon nanotube yarns, forming ends of the plurality of carbon nanotube yarns away from the conductive base into electron emitting ends.

10. The method of claim 9, wherein when a power of the laser beam is about 3.6 watts and a moving speed of the laser beam is in a range from about 5 mm/s to about 10 mm/s, the ends of the electron emitting ends are formed open.

11. The method of claim 1, wherein when a power of the laser beam is about 9.6 watts and a moving speed of the laser beam is in a range from about 100 mm/s to about 200 mm/s, the ends of the electron emitting ends are formed closed.

12. The method of claim 1, wherein in the step (S5), the plurality of carbon nanotube yarns are fixed on a plurality of conductive bases spaced from each other, and a plurality of carbon nanotube field emitters are formed after cutting off the plurality of carbon nanotube yarns.

13. The method of claim 1, wherein in the step (S5), the plurality of carbon nanotube yarns are cut so that a distance between adjacent two of the carbon nanotube yarns is 1.5-2.0 times as long as a length of the plurality of carbon nanotube yarns.

14. The method of claim 1, wherein in the step (S3), the oriented direction is parallel to a length direction of the plurality of carbon nanotubes.

15. A method for making carbon nanotube field emitter comprising:
   (S1) providing a carbon nanotube array comprising a plurality of carbon nanotubes formed on a surface of a substrate;
   (S2) cutting the carbon nanotube array to form a plurality of cutting planes and a plurality of carbon nanotube sub-arrays which are uniform, wherein an extending direction of the plurality of carbon nanotubes is parallel to the plurality of cutting planes;
   (S3) selecting a plurality of carbon nanotubes of the plurality of carbon nanotube sub-arrays and pulling out a plurality of carbon nanotube sub-films from the plurality of carbon nanotube sub-arrays which have been selected by a plurality of drawing tools;
   (S4) treating the plurality of carbon nanotube sub-films to form a plurality of carbon nanotube yarns; and
   (S5) fixing the plurality of carbon nanotube yarns on a surface of at least one conductive base, and cutting off the plurality of carbon nanotube yarns by a laser beam to form a carbon nanotube field emitter.

16. The method of claim 15, wherein in the step (S5), the plurality of carbon nanotube yarns are fixed on a plurality of conductive bases spaced from each other, and a plurality of carbon nanotube field emitters are formed after cutting off the plurality of carbon nanotube yarns.

17. The method of claim 15, wherein in the step (S2), the carbon nanotube array is cut by a laser beam to form the plurality of carbon nanotube sub-arrays.

18. The method of claim 15, wherein an electron emitting end of the carbon nanotube field emitter is a flat and is not a protrusion tip.

* * * * *